H. B. BAGG.
SPRING.
APPLICATION FILED AUG. 26, 1919.

1,388,913. Patented Aug. 30, 1921.

Inventor:
Hollis B. Bagg
by his Attys:

UNITED STATES PATENT OFFICE.

HOLLIS B. BAGG, OF WATERTOWN, CONNECTICUT, ASSIGNOR TO SCOVILL MANUFACTURING CO., OF WATERBURY, CONNECTICUT, A CORPORATION OF CONNECTICUT.

SPRING.

1,388,913.  Specification of Letters Patent.  Patented Aug. 30, 1921.

Application filed August 26, 1919. Serial No. 319,918.

*To all whom it may concern:*

Be it known that I, HOLLIS B. BAGG, a citizen of the United States, residing at Watertown, county of New Haven, and State of Connecticut, have invented certain new and useful Improvements in Springs, fully described and represented in the following specification and the accompanying drawings, forming a part of the same.

This invention relates to springs and more particularly to spring organizations having a plurality of nesting parts.

It is the object of the invention to provide a spring organization of the type mentioned, such that the friction between the opposing faces is minimized, and one capable of a more uniform action and a more accurate regulation.

The accompanying drawing illustrates and the following specification describes a spring organization constructed in accordance with the invention, it being understood that changes may be made in the form, construction and arrangement of the parts without departing from the invention.

In the drawing,—

Figure 1:
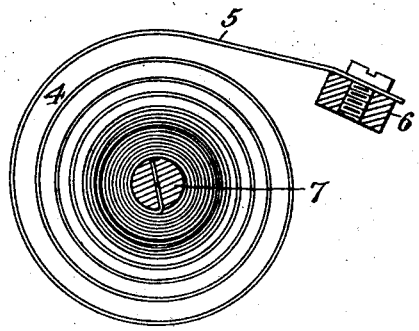
Figure 1 is an edge view of a spring embodying the invention in its preferred form, as applied to a spiral motor spring.
Figure 2:
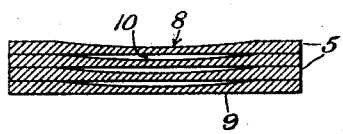
Fig. 2 is a representative cross-sectional view (enlarged) taken through a number of the coils of the spring shown in Fig. 1.

The invention includes a spring having a plurality of opposed faces nesting to have a greater frictional contact near the edges of the opposing faces than at the central portion thereof when the opposing faces are pressed together. This may be accomplished, for example, by having one of a pair of opposing faces slightly concaved, the other face being preferably flat, although it may have any other form suitable for securing the desired results. Although capable of various constructions, in the embodiment illustrated in Figs. 1 and 2, there is shown a spiral spring, indicated generally as 4, of the motor type. This spring is formed of a long, narrow band 5, of spring material. As here shown, one end of the band is anchored to an abutment 6, the other end being secured to a spindle 7. As appears in Fig. 2, which is somewhat exaggerated for the sake of clear illustration, one face of the band 5 is slightly concaved in cross section intermediate the edges, the part adjacent the edges being flat. It will be apparent that this provides for the several nesting coils, a series of concaved faces such as 8, opposing a series of flat faces, such as 9. When the spring is tightened up to bring the coils into nesting engagement, the frictional contact is near the edges of the band 5 or the pressure is greater there than at the central or intermediate portion. This provides what amounts to a chamber 10 for the lubricant, and squeezing out of the lubricant by the pressure of the opposing faces is prevented or greatly reduced. As a result more lubrication is provided than in the case of previously known springs.

With a construction such as that described, the friction between the opposing faces of the spring is greatly reduced and successive actions of the spring are more uniform. Further, when the spring is used, for example, to drive a phonograph motor or clockwork, there is possible a much more accurate regulation and the driven motor or clockwork runs longer on a winding.

Figure 3:
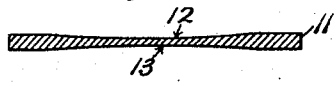
Fig. 3 is a cross-sectional view through one coil of a similar spring showing a modified construction.

In Fig. 3 there is illustrated another exemplification. In this embodiment, the band 11, analogous to band 5, has both faces concaved in cross section intermediate the edges. With such a construction less depression for each face is necessary. The concavity of the two faces 12 and 13 may be of the same or different degree. In either case the result is the same as above described.

It will be understood that although the spring illustrated is of the motor type, the invention is adapted also to other forms of spring having nesting parts, such, for example, as multiple leaf springs.

What is claimed is:

1. A spiral spring of the motor type formed of a long, narrow, coiled band slightly concaved in cross section on at least one face, said concavity extending across at least the greater portion of the face.

2. A spiral spring of the motor type formed of a long, narrow, coiled band having at least one face flat adjacent the edges and slightly concaved in cross section therebetween, said concavity extending across a greater portion of the face than said flat portions.

3. A spiral spring of the motor type formed of a long, narrow, coiled band having one face slightly concaved in cross section and the other face flat.

4. A spiral spring of the motor type formed of a long, narrow, coiled band having one face flat and the other face flat adjacent the edges and slightly concaved in cross section therebetween.

In testimony whereof, I have hereunto set my hand.

HOLLIS B. BAGG.